United States Patent
Isci et al.

(10) Patent No.: US 10,833,955 B2
(45) Date of Patent: Nov. 10, 2020

(54) DYNAMIC DELIVERY OF SOFTWARE FUNCTIONS

(71) Applicant: INTERNATIONAL BUSINESS MACHINES CORPORATION, Armonk, NY (US)

(72) Inventors: Canturk Isci, Ridgewood, NJ (US); Shripad Nadgowda, Pratap Nagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 15/861,274

(22) Filed: Jan. 3, 2018

(65) Prior Publication Data
US 2019/0207823 A1 Jul. 4, 2019

(51) Int. Cl.
| | |
|---|---|
| G06F 15/16 | (2006.01) |
| H04L 12/24 | (2006.01) |
| H04L 12/26 | (2006.01) |
| G06F 8/60 | (2018.01) |

(52) U.S. Cl.
CPC .......... H04L 41/20 (2013.01); G06F 8/60 (2013.01); H04L 41/0803 (2013.01); H04L 43/08 (2013.01)

(58) Field of Classification Search
CPC .................................................... H04L 41/20
USPC ........................................................ 709/224
See application file for complete search history.

(56) References Cited

U.S. PATENT DOCUMENTS

| | | | |
|---|---|---|---|
| 5,774,722 A | 6/1998 | Gheith | |
| 8,301,477 B2 | 10/2012 | Allam et al. | |
| 8,527,943 B1* | 9/2013 | Chiluvuri | G06F 8/36 717/106 |
| 9,223,546 B1 | 12/2015 | Chaffin | |
| 9,817,648 B2* | 11/2017 | Kirkpatrick | G06F 8/61 |
| 2005/0144226 A1 | 6/2005 | Purewal | |
| 2005/0192984 A1* | 9/2005 | Shenfield | G06F 8/36 |

(Continued)

FOREIGN PATENT DOCUMENTS

| | | |
|---|---|---|
| CN | 101174213 A | 5/2008 |
| CN | 104813331 A | 7/2015 |

(Continued)

OTHER PUBLICATIONS

Burns et al, "Design patterns for container-based distributed systems," In Proceedings of the 8th USENIX Workshop on Hot Topics in Cloud Computing (Hot-Cloud 16) (2016).

(Continued)

*Primary Examiner* — Hamza N Algibhah
(74) *Attorney, Agent, or Firm* — Intelletek Law Group, PLLC; Gabriel Daniel, Esq.

(57) ABSTRACT

A container cloud platform that allows software functions to be shared by multiple applications in different application containers is provided. The service functions are containerized and disaggregated from the application containers. The containerized services are delivered as a capsule for applications that invoke the service functions at application runtime. The images of the service containers are deployed at the host computing devices operating the corresponding application containers. The container cloud platform monitors the deployed service containers for their execution as well as their termination.

20 Claims, 8 Drawing Sheets

(56) References Cited

U.S. PATENT DOCUMENTS

| | | | |
|---|---|---|---|
| 2007/0201654 A1* | 8/2007 | Shenfield | G06F 9/44521 379/201.01 |
| 2007/0201655 A1* | 8/2007 | Shenfield | G06F 8/61 379/201.01 |
| 2008/0127137 A1 | 5/2008 | Becker et al. | |
| 2010/0083285 A1* | 4/2010 | Bahat | G06F 16/907 719/328 |
| 2011/0265081 A1* | 10/2011 | Lucovsky | G06F 8/60 717/177 |
| 2013/0152047 A1* | 6/2013 | Moorthi | G06F 11/368 717/124 |
| 2014/0047535 A1 | 2/2014 | Parla et al. | |
| 2014/0089915 A1* | 3/2014 | Haserodt | G06F 8/61 717/178 |
| 2014/0130009 A1 | 5/2014 | Gangadharan et al. | |
| 2016/0197995 A1* | 7/2016 | Lu | H04L 67/322 709/219 |
| 2016/0259934 A1 | 9/2016 | Rozenberg et al. | |
| 2016/0357451 A1* | 12/2016 | Chen | G06F 3/0611 |
| 2017/0085419 A1* | 3/2017 | Zhang | H04L 41/5051 |
| 2017/0134471 A1 | 5/2017 | Mathew et al. | |
| 2017/0201434 A1* | 7/2017 | Liang | G06F 11/3058 |
| 2017/0206071 A1* | 7/2017 | Kirkpatrick | G06F 8/61 |
| 2017/0208137 A1* | 7/2017 | Kirkpatrick | G06F 8/61 |
| 2017/0257432 A1* | 9/2017 | Fu | G06F 9/5072 |
| 2017/0364342 A1* | 12/2017 | Shuster | G06F 8/61 |
| 2018/0060055 A1* | 3/2018 | Kirkpatrick | G06F 8/71 |
| 2018/0246729 A1* | 8/2018 | Kumar | G06F 9/445 |
| 2018/0336079 A1* | 11/2018 | Soman | G06F 9/45504 |
| 2018/0359218 A1* | 12/2018 | Church | H04L 63/0263 |
| 2019/0004779 A1* | 1/2019 | Schmidt | G06F 8/60 |
| 2019/0108116 A1* | 4/2019 | Benes | G06F 11/3664 |
| 2019/0199601 A1* | 6/2019 | Lynar | H04L 41/5009 |

FOREIGN PATENT DOCUMENTS

| | | |
|---|---|---|
| CN | 107015823 A | 8/2017 |
| CN | 107636612 A | 1/2018 |

OTHER PUBLICATIONS

Kehrer et al., "TOSCA-based container orchestration on Mesos Two-phase deployment of cloud applications using container-based artifacts", Springer-Verlag GmbH Germany 2017.

Willis, "Docker and the Three Ways of DevOps" Docker, 2015.

Topchyan et al., "Scalable Sandbox Environments for a Modern Organization" Trudy ISP RAN/Proc. ISP RAS, vol. 28, issue 4, 2016, pp. 29-40.

International Search Report and Written Opinion from counterpart PCT Application No. PCT/IB2018/060193 dated Mar. 19, 2019; 9 pgs.

* cited by examiner

US 10,833,955 B2

DYNAMIC DELIVERY OF SOFTWARE FUNCTIONS

BACKGROUND

Technical Field

The present disclosure generally relates to tools for development and deployment of software.

Description of the Related Art

In agile DevOps (development and operations) environment, applications are increasingly being containerized. An application includes an entire runtime environment for running the desired software: an application, plus all its dependencies, libraries and other binaries, and configuration files to run the software, bundled into one package. By containerizing the application platform and its dependencies, differences in OS distributions and underlying infrastructure are abstracted away. The complete set of information of an application container is the image. An image is an inert, immutable file that is a snapshot of a container. A container image is created with a build command. The container image produces an application container when deployed or executed on host machines or host computing devices.

SUMMARY

Some embodiments of the disclosure provide a container cloud platform that allows software functions to be shared by multiple applications in different application containers. The service functions are containerized and disaggregated from the application containers. The containerized services are delivered as a capsule for applications that invoke the service functions at application runtime. The images of the service containers are deployed at the host computing devices operating the corresponding application containers. The container cloud platform monitors the deployed service containers for their execution as well as their termination.

The container cloud platform includes a run-escape controller that monitors a set of host computing devices. Each host computing device operates one or more application containers. The run-escape controller identifies a capsule image having a metadata that matches an application container operating in a host computing device. The run-escape controller deploys the identified capsule image to the host computing device as a capsule container. The deployed capsule container includes a service function that is invoked by a core function of the matching application container. The run-escape controller receives an exit code from the host computing device based on execution of the service function.

A host machine operates an application container that executes a core function that invokes a service function. The host machine receives a capsule image comprising images of the service function. The capsule image has a metadata that matches the application container. The host machine launches a capsule container based on the capsule image to execute the service function invoked by the core function of the application container. The host machine exits the capsule container after the service function completes execution.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
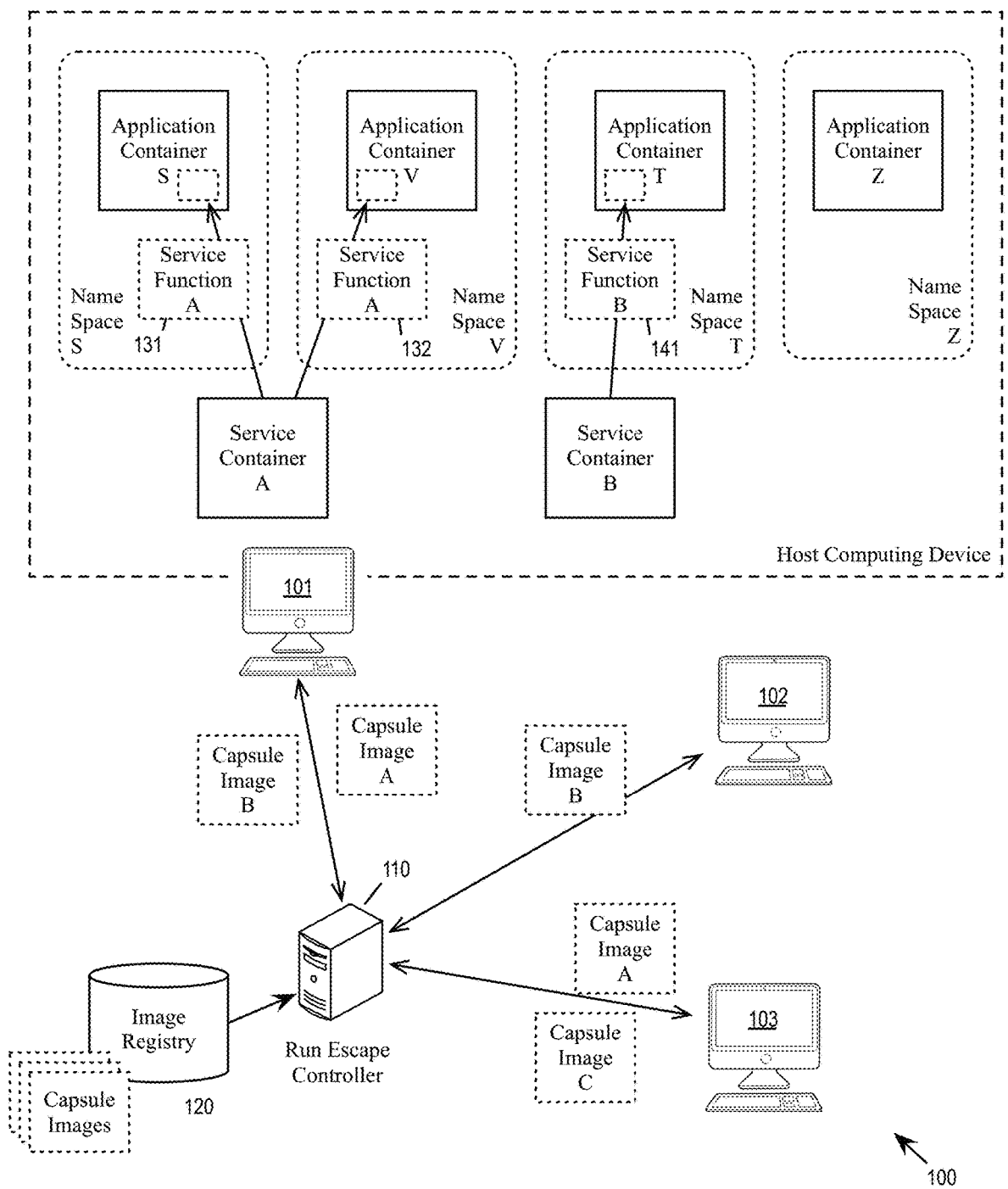
FIG. 1 conceptually illustrates a container cloud platform that deploys service containers to host computing devices operating application containers, consistent with an exemplary embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

An application has many component software functions. Some of these functions can be classified as core function and others can be classified as service or secondary software functions. Core functions are typically written specifically for the application by the application developer to define the application. They are not predefined for use by different applications. Service or secondary functions support the implementation of the core functions. They are typically pre-defined functions written for use by different applications (e.g., as libraries). Some service functions are lower-level routines targeting specific hardware platforms. Examples of such secondary or service functions include periodically invoked functions such as NTP update, data backup, data consistency check function. Examples of secondary or service functions also include sporadic functions such as increasing size of database table and selective data compression or pruning functions.

Secondary software functions used by an application are usually built together with the core functions of the application in a same container image. This results in bloated container images, with portions of the images that correspond to the common secondary software functions being built again and again.

In order to disaggregate the secondary function from the image of the application container, some embodiments of the disclosure provide a container cloud platform that allows software functions, e.g., secondary service functions, to be shared by multiple applications in different application containers. The service functions are containerized and di saggregated from the application containers. The containerized services are delivered as a capsule for applications that invoke the service functions at application runtime. These containerized services are referred to as service containers. The images of the service containers are deployed at the host computing devices operating the corresponding application containers. The container cloud platform monitors the deployed service containers for their execution as well as their termination. In some embodiments, service containers are deployed at host computing devices as capsule images, hence a service container can also be referred to as a capsule container.

The container cloud platform 100 is managed and controlled by a run-escape controller 110. The run-escape controller 110 communicates with host computing devices 101-103 that participate in the container cloud platform 100. The computing devices 101-103 and the run-escape controller 110 may use their respective network interfaces to communicate with each other through the Internet, the computing cloud, local area network, or another type of communications medium.

The run-escape controller 110 is a computing device that has access to an image registry 120, which stores a variety of software images, including capsule images for different service functions. When deployed at a host machine running an application container, a capsule image is executed as a service container. The run-escape controller 110 monitors the host machines 101-103 for the application containers that are operating in those computing devices. The run-escape controller 110 identifies the service functions needed by those application containers and deploys corresponding capsule images of the service containers to those host machines. In the example, the container cloud platform dispatches or deploys capsule images A and B to the host machine 101, capsule image B to the host machine 102, and capsule images A and C to the host machine 103.

As illustrated, the host computing device 101 is operating application containers S, V, T, and Z. The image of each of these application containers includes images of one or more core functions. However, the images of the application containers S, V, and T do not include the images or the dependencies of the service functions that are used to run the core functions. In the example, the core functions of the application containers S and V involve service function A, but the images of the application containers S and V do not include service function A. The core functions of the application container T involve service function B, but the image of the application container T does not include service function B. Correspondingly, the run-escape controller 110 of the container cloud platform 100 deploys capsule images for service function A and service function B to the host computing device 101.

Once a capsule image is deployed in a host machine, the host machine may execute the capsule image as a service container for the service function. The host machine runs the service function for core functions that invoke the service function. In the example of FIG. 1, the host computing device 101 executes the capsule image A as a service container A fur service function A. This allows the host computing device 101 to execute the core functions of the application containers S and V correctly with service function A. Likewise, the host computing device 101 executes the capsule image B as a service container B for service function B. This allows the host computing device 101 to execute the core functions of the application container T correctly with service function B.

In some embodiments, for each application container that uses a service function, the corresponding service container starts a service thread that runs an instance of the service function for the application container. The host machine exits each instance of the service function by terminating its corresponding service thread when the service thread completes its operations. Since the thread of the service function in the service container exits as soon as its finishes running the service function, a capsule image of a service container is referred to as a run-escape capsule (RIE). The controller 110 of the container cloud platform 100 is referred to as a run-escape controller since it monitors and controls the execution and the termination of each run-escape capsule.

In some embodiments, each service thread of an instance of the service function operates in the name space of the application container that invokes the instance of the service function. As illustrated, the service container A operates a first service thread for a first instance 131 of the service function A in the name space of the Application container S. The service container A also operates a second service thread for a second instance 132 of the service function A in the name space of the Application container V. Since the two instances 131 and 132 of the service function A operate in different name spaces, the operations of the service function A for the application container S would not interfere with the operations of the service function A for the application container V and vice versa. Similarly, the service container B operates a service thread for an instance 141 of the service function B in the name space of the Application container T.

in some embodiments, the host machine may operate the different instances of the service function for different application containers in parallel. The host machine may also operate only one instance of the service function at any given time such that each application container that invokes the service function has to wait for its turn to run the service function (e.g., in sequence or iteratively).

The deployment of the capsule images allows the images of the application containers to carry only the core functions and not the service functions and their dependencies. The deployment of the capsule images also allows different application containers in the same host machine to share the same service function image. Furthermore, the container cloud platform can deploy the same capsule image to different host machines such that application containers in different host machines may invoke the same service function without having to carry the service function in their container images. In the example of FIG. 1, the run-escape controller 110 deploys capsule image A to both host machines 101 and 103, capsule image B to both host machines 101 and 102.

In some embodiments, each capsule image is associated with a set of metadata. The metadata of a capsule image provides labels or tags that a host machine receiving the capsule image may use to identify the application containers that match the service function of the capsule image. The metadata of a capsule image also allows the run-escape controller 110 to identify the host machines that runs the matching application containers.

Figure 2:
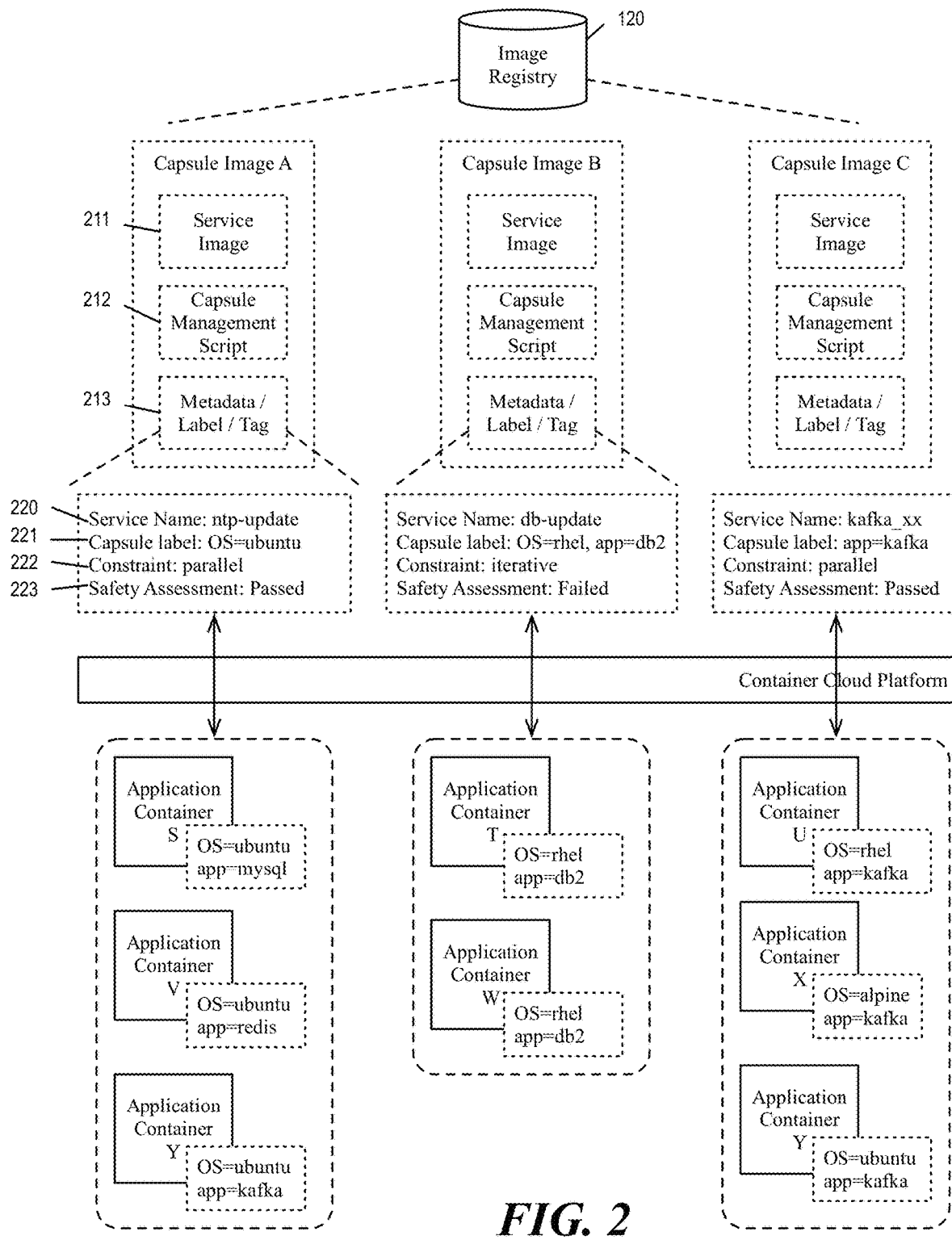
FIG. 2 conceptually illustrates using the metadata of a capsule image to identify matching application containers, consistent with an exemplary embodiment.

FIG. 2 conceptually illustrates using the metadata of a capsule image to identify matching application containers, consistent with an exemplary embodiment. As illustrated, capsule images A, B, and C are registered at the image registry 120, which is accessible by the run-escape controller 110 of the container cloud platform 100. The run-escape controller 110 is monitoring several application containers S, T, U, V, W, X, and Y. These application containers are operating in host machines such as the host machines 101-103 (not illustrated). Each capsule image may include the image of a service function, a capsule management script, and a metadata.

The capsule image A includes a service image 211, a capsule management script 212, and a metadata 213.

The service image 211 is the image of the service function that can be executed to perform the service function of capsule image A.

The capsule management script 212 manages the communications between the run-escape controller 110 that deploys the capsule image and the host machine that receives the deployed capsule image. The capsule management script 212 is also configured to call the default entry point. The capsule management script 212 allows run-escape controller 110 to communicate with the capsule container for management activities. For example, the run-escape controller 110 may invoke the capsule management script to query the status of the service function running inside the service container.

The metadata 213 includes a set of capsule labels 221. The set of capsule labels 221 specify the criteria for identifying matching application containers for the service function of capsule image A. The set of capsule labels 221 specifies "OS=ubuntu", i.e., using Ubuntu operating system. This matches the application containers S, V, and Y, which are using Ubuntu operating system ("OS=ubuntu). The run-escape controller 110 in turn deploys the capsule image A to host machines operating application containers S, V, or Y (e.g., host machine 101 and 103).

In addition to the set of capsule labels 221, the metadata 213 of a capsule image also includes information such as an identifier of the service function 220, a constraint parameter 222, and a safety assessment flag 223. The constraint parameter 222 indicates whether the host machine can operate the different instances of the service function for different application containers in parallel, or only one instance of the service function at any given time The safety assessment flag 223 is an indication of whether the capsule image passed or failed a security test. The run-escape controller 110 may use this flag to determine whether to limit the execution of that service function for certain application containers. This ensures security of service functions being executed.

FIG. 2 also illustrates the content of capsule images B and C. The set of capsule labels of the capsule image B specifies "OS=rhel, app=db2". This matches application containers T and W, so the run-escape controller 110 deploys the capsule image B to host machines operating application containers T or W. The capsule label of the capsule image C specifies "app=kafka". This matches application containers U, X and Y, so the run-escape controller 110 deploys the capsule image C to host machines operating application containers U, X, or Y.

It is worth noting that one application container may use service functions from multiple different capsule images. In the example, the application container Y matches the capsule labels of both capsules A and C (OS=ubuntu and app=kafka), so the run-escape controller 110 deploys both capsule images A and C at host machines operating the application container Y.

Figure 3:
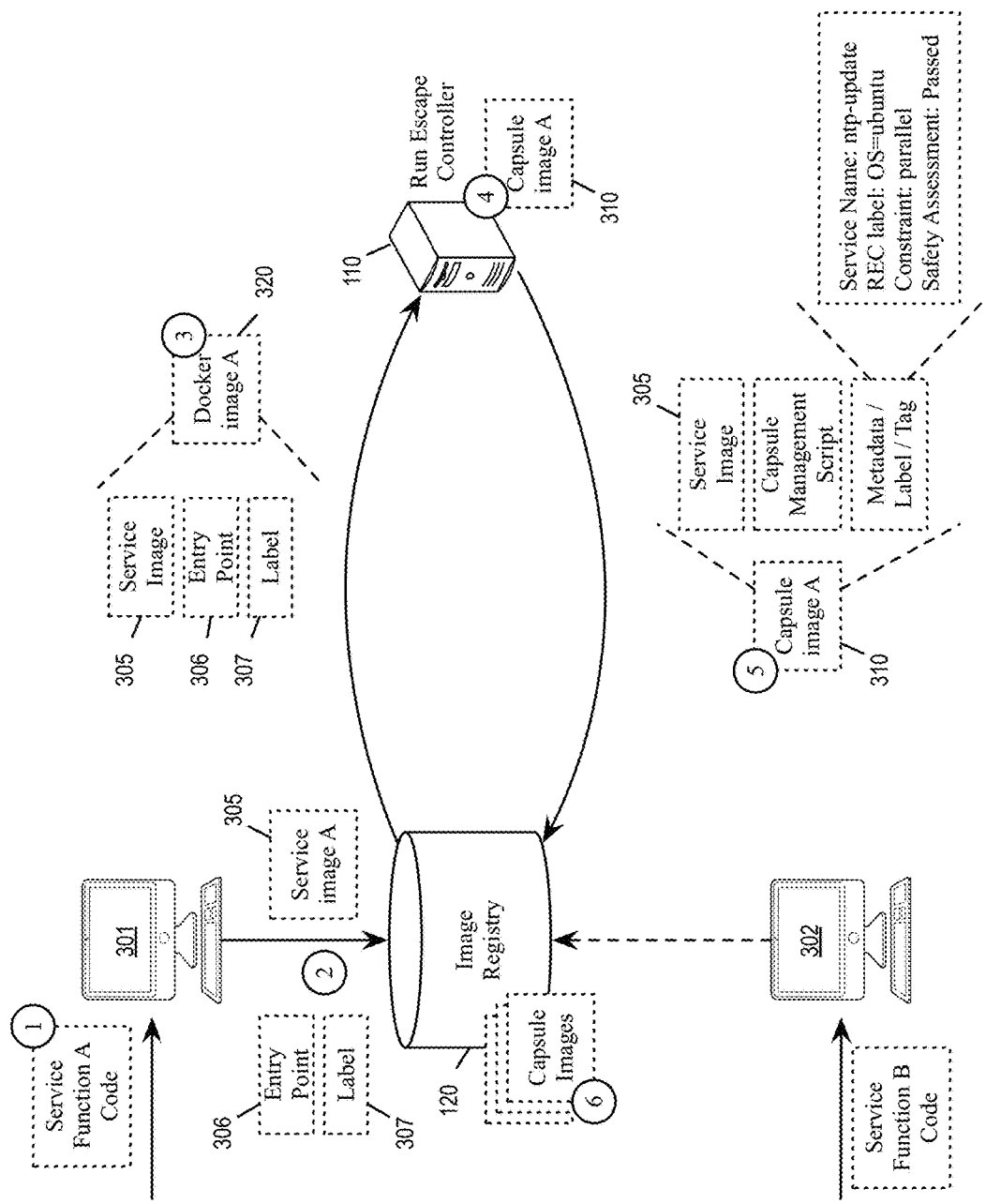
FIG. 3 illustrates the creation of capsule images, consistent with an exemplary embodiment.

FIG. 3 illustrates the creation of capsule images, consistent with an exemplary embodiment. The capsule images of service containers are created based on codes or definitions of service functions provided by a developer. The created capsule images are registered with the image registry 120 for retrieval by the run-escape controller 110, which deploys the capsule images to the application containers operating in host machines. The figure illustrates creation and registration of capsule images in six stages that are labeled '1' through '6'.

At the first stage (labeled '1'), a developer computing device 301 receives specification or content (e.g., code) of a service function.

At the second stage (labeled '2'), the developer computing device 301 creates a service image 305 for the received service function. The service image 305 is created with a build command to include all dependencies and libraries required by the service function. The developer computing device also specifies a start-script or a default entry point 306 for invoking the service function. The developer computing device also specifies the label 307 that identifies which application containers monitored by the container cloud platform should receive the service image. The service image 305, the entry point 306, and the label 307 are stored in the image registry 120 as a docker image 320. A docker image is an image of a docker container, which is an open source software development platform. The docker container allows the service function to be portable among any system running the Linux operating system (OS).

At the third stage (labeled '3'), the run-escape controller 110 retrieves the docker image 320 from the image registry 120.

At the fourth stage (labeled '4'), the run-escape controller 110 creates a capsule image 310 that wraps the service image. The run-escape controller 110 overwrite the default entry point of the service image with a capsule management script (e.g., 212) that is configured to call the default entry point of the service image. The run-escape controller 110 also performs security or vulnerability assessment of the newly created capsule image. The result of the security assessment is included in the metadata of the capsule image (which includes the service image) as a security assessment flag (e.g., 223).

At the fifth stage, the run-escape controller 110 stores or registers the newly created capsule image 310 into the image registry 120. The capsule image 310 includes the image of the service function, the capsule management script, and the metadata of the service function. The metadata of the service function includes capsule label, constraints, and security assessment result flag. In some embodiments, the run-escape controller 110 registers or stores only capsule images that pass the security assessment.

At the sixth stage, the capsule image 310 is registered at the image register 120 for subsequent retrieval and deployment by the run-escape controller 110. Other service images of other service functions from other developer computing devices (e.g., 302) may also be processed by the run-escape controller 110 to create other capsule images.

Figure 4:
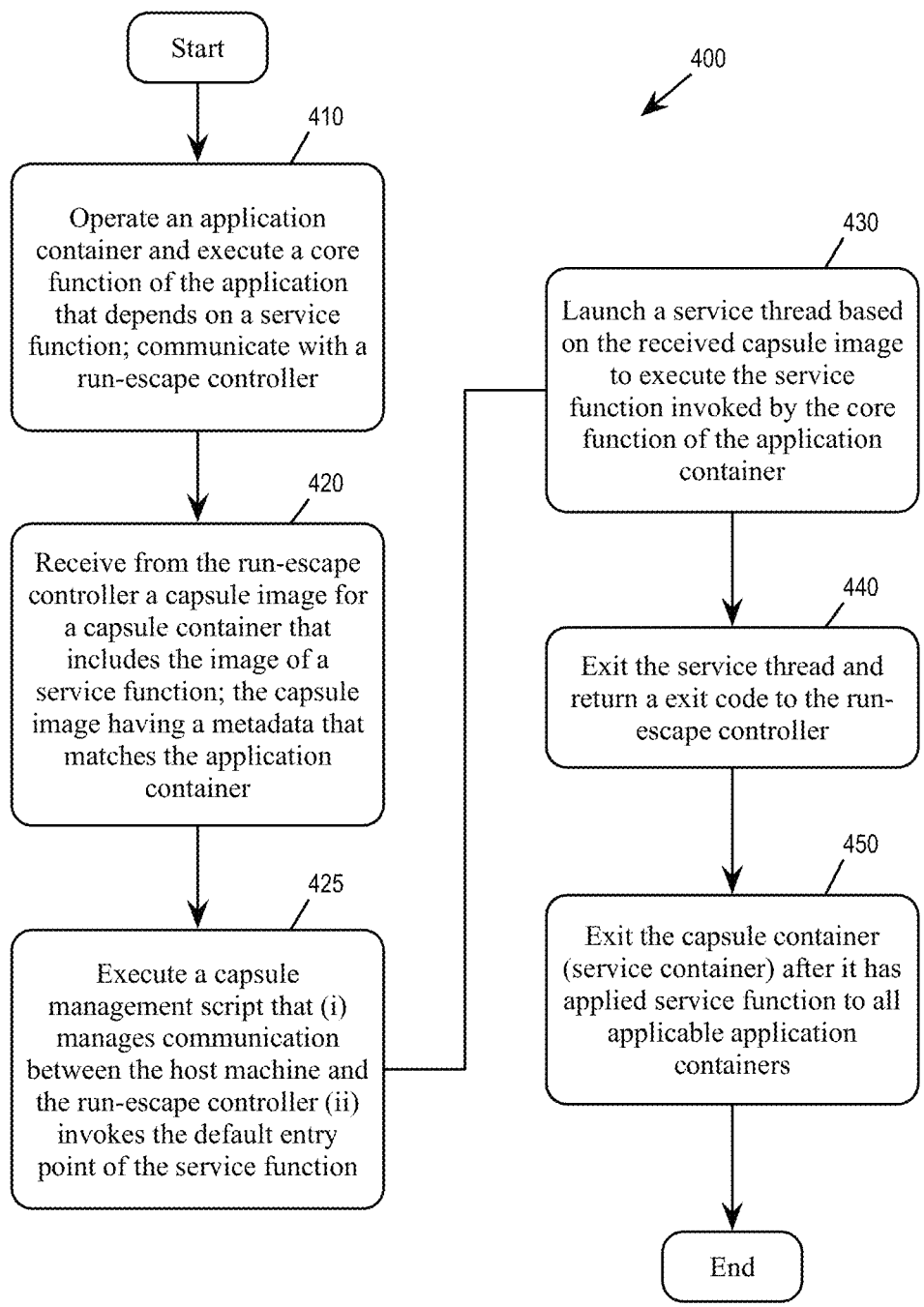
FIG. 4 conceptually illustrates a process for executing capsule images as service containers for core functions in application containers, consistent with an exemplary embodiment.

FIG. 4 conceptually illustrates a process 400 for executing capsule images as service containers for core functions in application containers, consistent with an exemplary embodiment. In some embodiments, a host machine (e.g., 101) performs the process 400 when it operates application containers and is in communication with the run-escape controller 110 of the container cloud platform. In some embodiments, one or more processing units (e.g., processor) of the host machine perform the process 400 by executing instructions stored in a computer readable medium.

The host machine operates 410) an application container and executes a core function of the application that depends on (or invokes) a service function. The host machine may also operate other application containers with other core functions. The host machine is in communication with the run-escape controller 110 so that the run-escape controller 110 can learn which application containers are operating in the host machine and what service functions are needed by their core functions.

The host machine receives (at 420) a capsule image from the run-escape controller 110. The capsule image includes the image of a service function (or the service image) and its dependencies. The capsule image has a metadata with a label that matches the service function with application containers that use the service function.

The host machine executes (at 425) a capsule management script of the capsule image. The capsule management script manages communications between the host machine and the run-escape controller that deploys the capsule image. The manage script is also configured to invoke the default entry point of the service function.

The host machine launches (at 430) a service thread based on the capsule image to execute the service function invoked by the core function of the application container. In some embodiments, the service thread is for one instance of the service function that operates in the name space of one application container, such that the operations of the service thread would not interfere with the operations of other containers in the host machine. A constraint parameter (e.g., 222) in the metadata of the capsule image may allow the host machine to operate different instances (e.g., as service threads 131 and 132) of the service function for different application containers in parallel or limit the host machine to operate only one instance of the service function at one time.

The host machine exits (at 440) the service thread after the thread completes its operation for the application container. In some embodiments, the host machine also reports an exit code to the run-escape controller 110. The capsule container at the host machine may re-trigger the service thread if required by the application container.

The host machine exits (at 450) the service container (capsule container) it has applied the service function to all applicable application containers (or when the run-escape controller 110 directs the host machine to forcefully exit the application container). The process 400 then ends.

Figure 5:
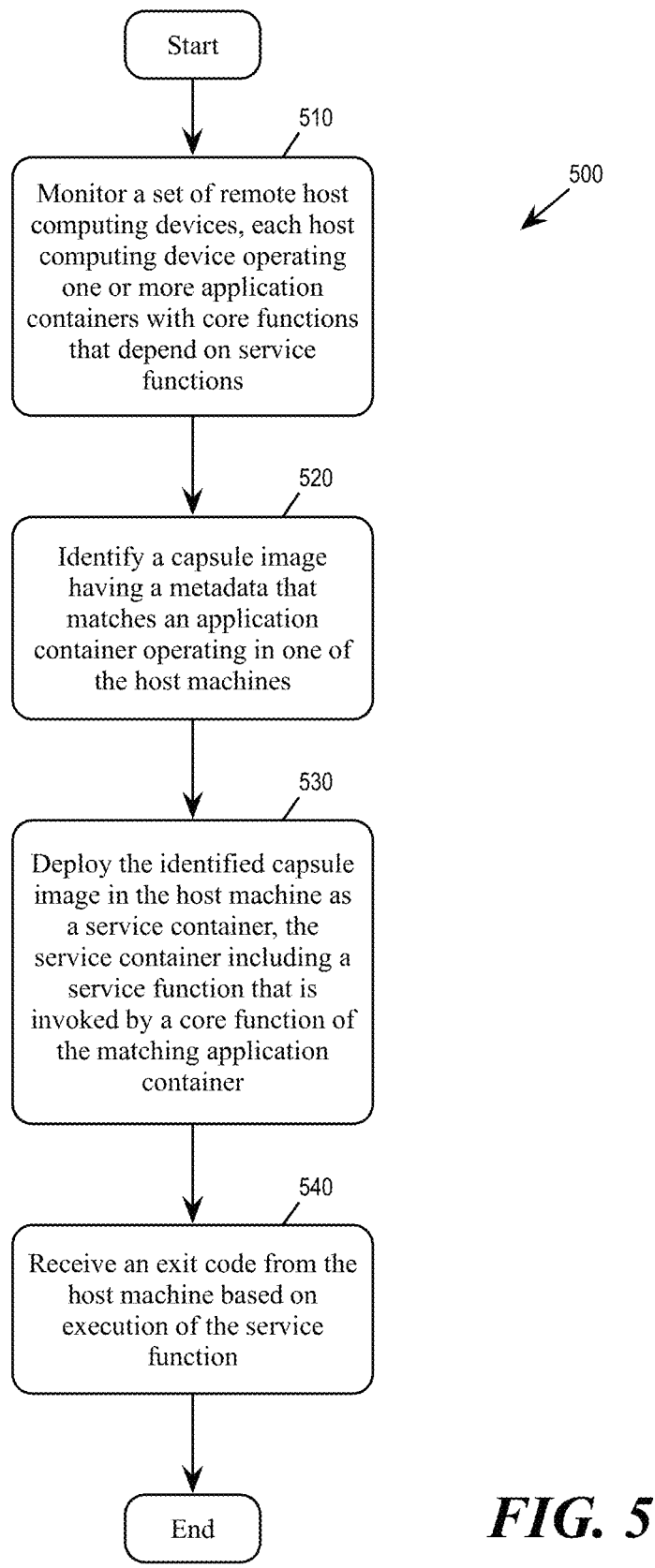
FIG. 5 conceptually illustrates a process for deploying capsule images of service functions to host machines running application containers that use the service functions.

FIG. 5 conceptually illustrates a process 500 for deploying capsule images of service functions to host machines running application containers that use the service functions. In some embodiments, the run-escape controller 110 performs the process 500 when it monitors remote host machines for application containers that depend on the service functions. In some embodiments, one or more processing units (e.g., processor) of the run-escape controller 110 performs the process 500 by executing instructions stored in a computer readable medium.

The run-escape controller 110 monitors (at 510) a set of remote host computing devices, each host computing device operating one or more application containers with core functions that depend on service functions.

The run-escape controller 110 identifies 520) a capsule image having a metadata that matches an application container operating in one of the host machines. In some embodiments, this matching is based on a capsule label (e.g., 221) in the metadata of the capsule image. The label can be inserted by the developer of the service function at the developer computing device (e.g., 301), or by the run-escape controller 110. In some embodiments, the run-escape controller 110 determines whether to deploy the capsule image based on a security assessment flag (e.g., such that cloud images that fail the security assessment would not be deployed.

The run-escape controller 110 deploys (at 530) the identified capsule image in the host machine that operates the matching application container as a service container. This service container (or capsule container) includes the service function that is invoked by a core function of the matching application container.

The run-escape controller 110 receives (at 540) an exit code from the host machine. The exit code indicates complete execution of the service function for one application container or for all application containers that use the service function. In some embodiments, the run-escape controller 110 reports to an admin if it fails to receive exit code from the host machine within a threshold time period or if the exit code indicates that the execution of the service function had errors. The process 500 then ends.

Though not illustrated as being part of the process 500, the run-escape controller 110 also retrieves service images from the image registry 120 and modifies them to become capsule images during operation of the process 500. As mentioned by reference to FIG. 3 above, the run-escape controller 110 retrieves the service image to create a capsule image that wraps the service image. The default entry point of the service image is overwritten with a capsule management script. The run-escape controller 110 also performs security or vulnerability assessment of the newly created capsule image. The newly created capsule image is registered at the image registry 120.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 4, 5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
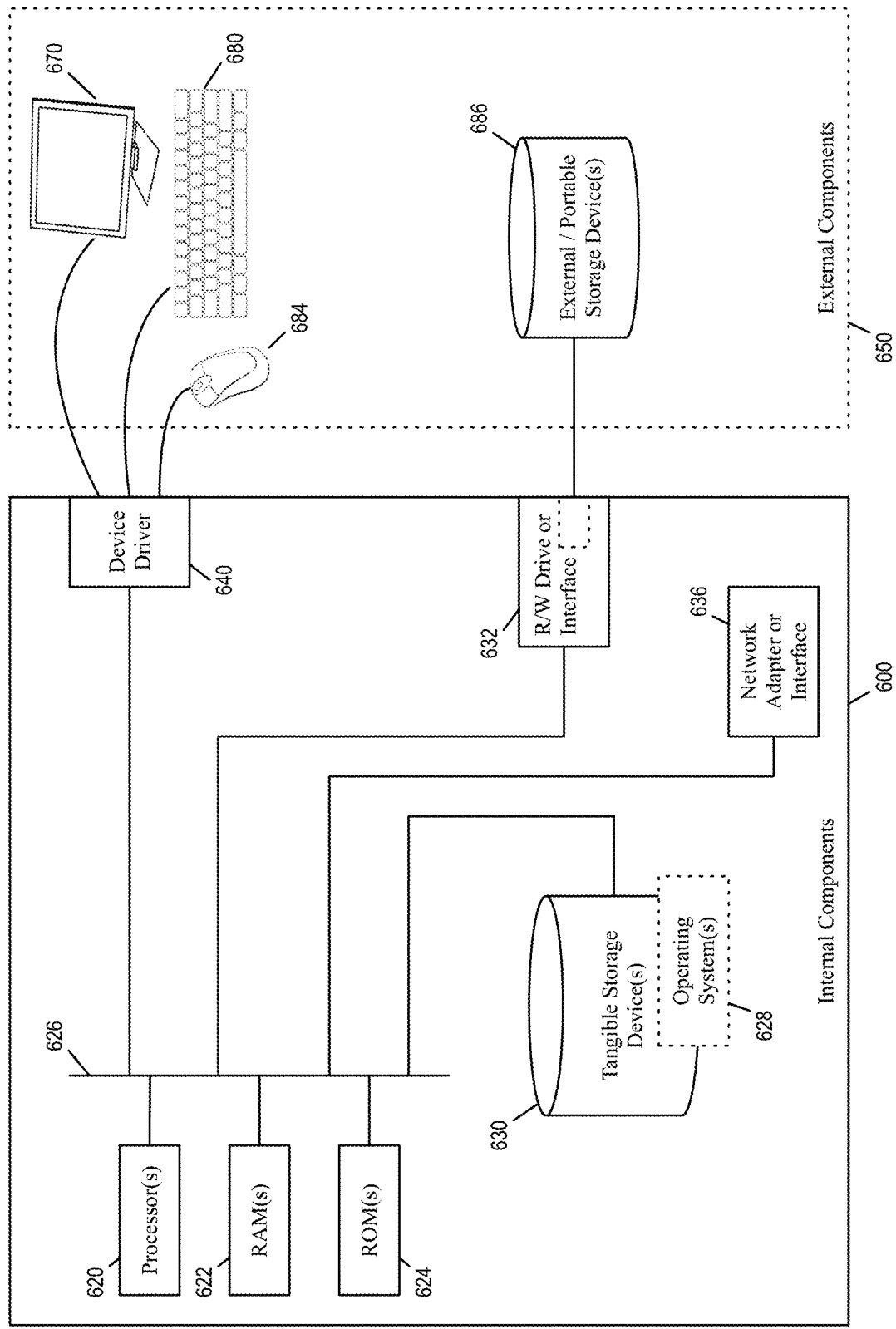
FIG. 6 shows a block diagram of the components of a data processing system in accordance with an illustrative embodiment of the present disclosure.

FIG. 6 shows a block diagram of the components of data processing systems 600 and 650 that may be used to implement the run-escape controller 110 or a host machine (e.g., 101) in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 600 and a set of external components 650 illustrated in FIG. 6. The set of internal components 600 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the processes 400 and 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 600 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the processes 400 and 500 can be stored on one or more of the respective portable computer-readable tangible storage devices 686, read via the respective R/W drive or interface 632 and loaded into the respective hard drive 630.

The set of internal components 600 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 650 can include a computer display monitor 670, a keyboard 680, and a computer mouse 684. The set of external components 650 can also include touch screens, virtual keyboards, touch pads, pointing devices, and other human interface devices. The set of internal components 600 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

Cloud Computing Environment

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Example Characteristics:

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms mobile phones, laptops, and PDAs).

Resource pooling; the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Example Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls), Deployment Models:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 7:
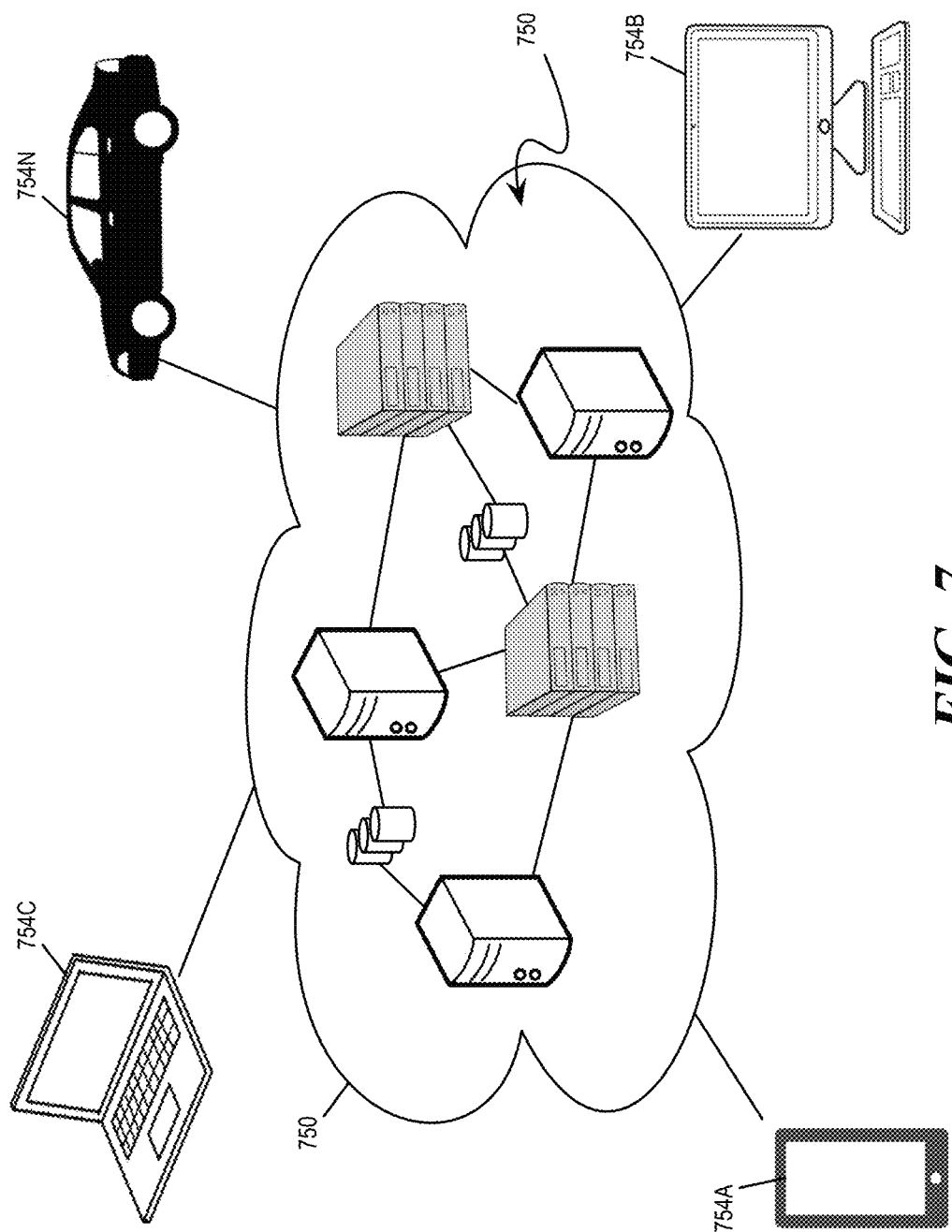
FIG. 7 illustrates an example cloud-computing environment.

Referring now to FIG. 7, an illustrative cloud computing environment 750 is depicted. As shown, cloud computing environment 750 includes one or more cloud computing nodes 710 with which local computing devices used by cloud consumers, such as, for example, personal digital assistant (RDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
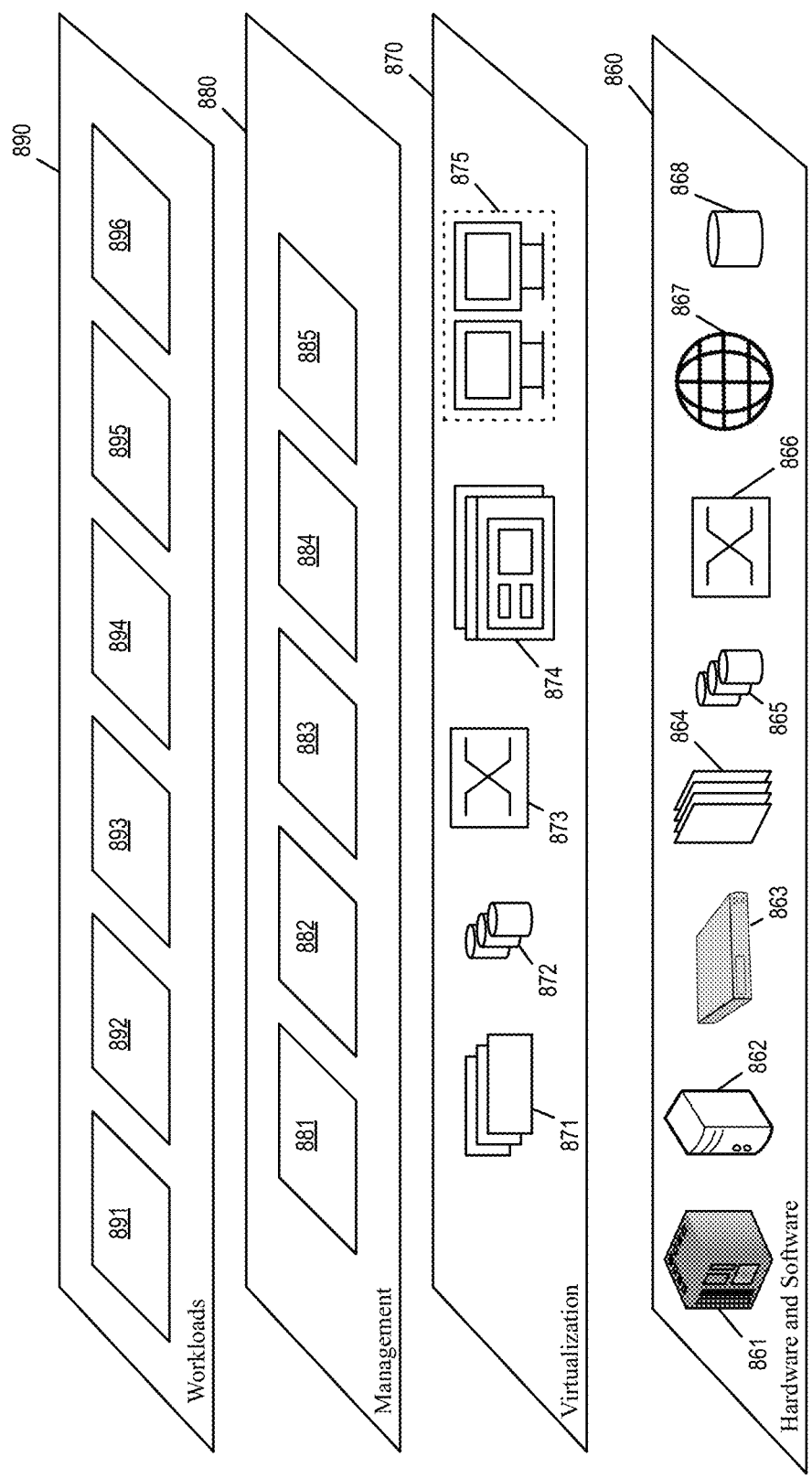
FIG. 8 illustrates a set of functional abstraction layers provided by a cloud-computing environment, consistent with an exemplary embodiment.

Referring now to FIG. 8, a set of functional abstraction layers provided by cloud computing environment 750 (of FIG. 7) is shown. It should be understood that the components, layers, and functions shown in FIG. 8 are intended to be illustrative only and embodiments of the disclosure are not limited thereto. As depicted, the following layers and corresponding functions are provided:

Hardware and software layer 860 includes hardware and software components, Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below, Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud-computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and run-escape control 896. In some embodiments, the workload 896 performs some of the operations of the run-escape controller 110 in the container cloud platform 100.

The foregoing one or more embodiments in which a computing infrastructure implements a container cloud platform that has a run-escape controller computing device monitoring several host computing devices that run application containers. The run-escape controller deploys capsule images to the host computing devices, and the host computing devices runs service containers from the deployed capsule images in order to provide service functions for the core functions in the application containers.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a network interface;
a processor; and
a storage device storing a set of instructions, wherein an execution of the set of instructions by the processor configures the computing device to perform acts comprising:
operating an application container executing a core function that invokes a service function;
receiving over the network interface, a capsule image comprising images of the service function, the capsule image having a metadata that matches the application container;
launching a capsule container based on the capsule image to execute the service function invoked by the core function of the application container; and
exiting the capsule container after the service function completes execution, wherein an image of the application container does not include images or dependencies of the service function invoked by the core function.

2. The computing device of claim 1, wherein launching the capsule container to execute the service function comprises starting a service thread that runs the service function in a name space of the application container.

3. The computing device of claim 1, wherein launching a capsule container to execute the service function comprises executing a management script of the capsule image configured to communicate with a controller computing device and invoking a default entry point of the service function.

4. The computing device of claim 1, wherein the application container is one of a plurality of application containers that invokes the service function, where each application container of the plurality of application containers matches the metadata of the capsule image.

5. The computing device of claim 4, wherein a plurality of service threads for the service function executes in parallel for the plurality of application containers.

6. The computing device of claim 4, wherein the metadata of the capsule image comprises an indication of whether to allow multiple threads of the service function to execute in parallel for the plurality of application containers.

7. The computing device of claim 1, wherein the metadata of the capsule image comprises an indication of whether the capsule image passes a safety assessment.

8. The computing device of claim 1, wherein the image of the application container does not include the service function.

9. The computing device of claim 1, wherein:
the capsule image is received from a controller computing device, and
exiting the capsule container comprises reporting an exit code to the controller computing device.

10. The computing device of claim 1, wherein the application container is a first application container, the service function is a first service function, and the capsule image is a first capsule image, wherein the execution of the set of instructions by the processor further configures the computing device to perform acts comprising:
receiving a second capsule image comprising a second service function that is different than the first capsule image and the first service function, wherein the second capsule image comprises a metadata that matches a second application container with the second service function; and
launching the second capsule image to execute the second service function for a core function of the second application container.

11. A computing device comprising:
a set of one or more processing units; and
a storage device storing a set of instructions, wherein an execution of the set of instructions by the set of processing units configures the computing device to perform acts comprising:
monitoring, over a network interface, a set of host computing devices, each host computing device operating one or more application containers;
identifying a capsule image having a metadata that matches an application container operating in a host computing device;
deploying the identified capsule image to the host computing device as a capsule container, wherein the deployed capsule container comprises a service function that is invoked by a core function of the matching first application container; and
receiving an exit code from the host computing device based on an execution of the service function, wherein an image of the application container does not include images or dependencies of the service function invoked by the core function.

12. The computing device of claim 11, further comprising retrieving the identified capsule container image from a registry storing a plurality of capsule images.

13. The computing device of claim 11, wherein the image of the application container does not include the service function.

14. The computing device of claim 11, wherein the metadata of the capsule image comprises an indication of whether to allow multiple threads of the service function to execute in parallel for the plurality of application containers.

15. The computing device of claim 11, wherein the metadata of the capsule container comprises an indication of whether the capsule container passes a safety assessment.

16. The computing device of claim 11, wherein the capsule container comprises a management script that overrides a default entry point of the service function.

17. The computing device of claim 11, wherein the execution of the set of instructions by the set of processing units further configures the computing device to perform acts comprising:
identifying a second host computing device operating a second application container matching the metadata of the capsule container; and
deploying the identified capsule container image to the second host computing device, wherein the service function is invoked by a core function of the second matching application container operating in the second host computing device.

18. The computing device of claim 11, wherein the application container is a first application container, the service function is a first service function, and the capsule image is a first capsule image, wherein the execution of the set of instructions by the set of processing units further configures the computing device to perform acts comprising:
deploying to the host computing device a second capsule image comprising a second service function that is different than the first capsule image, wherein:
a core function of the second application container invokes the second service function, and
the second capsule image comprises a metadata that matches the second application container.

19. A computing device comprising:
a processor; and
a storage device storing a set of instructions, wherein an execution of the set of instructions by the processor configures the computing device to perform acts comprising:
receiving an image of a service function having a default entry point;
constructing a capsule image for the service function;
associating a metadata label with the capsule image for identifying an application container that matches the service function;
embedding a capsule management script in the capsule image for (i) managing communications between a controller computing device that deploys the capsule image and the host machine that receives the deployed capsule image, and (ii) invoking the default entry point of the service function; and
storing the capsule image in a registry of capsule images, wherein an image of the application container does not include images or dependencies of the service function invoked by the core function.

20. The computing device of claim 19, wherein the capsule image comprises dependencies for the service function.

\* \* \* \* \*